United States Patent
Tajima et al.

(10) Patent No.: US 8,170,622 B2
(45) Date of Patent: May 1, 2012

(54) MOBILE COMMUNICATION NETWORK SYSTEM AND LOCATION REGISTRATION METHOD

(75) Inventors: Yoshiharu Tajima, Kawasaki (JP);
Hideto Furukawa, Kawasaki (JP);
Kazuo Kawabata, Kawasaki (JP);
Yoshihiro Kawasaki, Kawasaki (JP);
Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/169,590

(22) Filed: Jun. 27, 2011

(65) Prior Publication Data

US 2011/0255457 A1    Oct. 20, 2011

Related U.S. Application Data

(62) Division of application No. 11/270,680, filed on Nov. 10, 2005, now Pat. No. 7,983,673.

(30) Foreign Application Priority Data

Aug. 4, 2005 (JP) .................. 2005-227107

(51) Int. Cl.
*H04B 1/38* (2006.01)

(52) U.S. Cl. .......... 455/572; 455/550.1; 455/343.1; 455/343.2; 455/115.1; 455/272; 370/334; 370/338; 370/332; 370/333

(58) Field of Classification Search .......... 455/572, 455/550.1, 91, 127.1, 127.5, 343.1, 343.2, 455/343.3, 115.1, 115.2, 272; 370/334, 338, 370/332, 333

See application file for complete search history.

(56) References Cited

U.S. PATENT DOCUMENTS

| | | | |
|---|---|---|---|
| 5,732,350 A | 3/1998 | Marko | |
| 5,901,359 A | 5/1999 | Malmstrom | |
| 7,379,729 B2 * | 5/2008 | Holland et al. | 455/404.2 |
| 7,734,269 B2 * | 6/2010 | Komulainen et al. | 455/277.2 |
| 2004/0248574 A1 * | 12/2004 | Watanabe et al. | 455/435.1 |
| 2005/0070283 A1 * | 3/2005 | Hashimoto et al. | 455/435.1 |
| 2005/0186961 A1 | 8/2005 | Aikawa | |
| 2005/0195779 A1 | 9/2005 | Matsumoto | |

FOREIGN PATENT DOCUMENTS

EP    0928120A2 A2    7/1999

(Continued)

OTHER PUBLICATIONS

Notice of Reason for Rejection dated Aug. 3, 2010 received in corresponding Japanese Patent Application No. 2005-227107.

(Continued)

*Primary Examiner* — Ajit Patel
*Assistant Examiner* — Khai M Nguyen
(74) *Attorney, Agent, or Firm* — Murphy & King, P.C.

(57) ABSTRACT

The mobile communication network system having a plurality of mobile communication systems each including a base station performing wireless communications with a mobile station, comprises a storage unit storing location information of the mobile station, an acquisition unit acquiring, when receiving a location registering request from the mobile station, a communication-enabled mobile communication system in the mobile station as a sender of the location registering request, a specifying unit specifying a base station existing within the acquired communication-enabled mobile communication system and existing in the periphery of the base station receiving the location registering request, and a control unit storing the storage unit with information of the base station receiving the location registering request and information of the specified base station as location information about the sender mobile station of the location registering request.

2 Claims, 11 Drawing Sheets

FOREIGN PATENT DOCUMENTS

| | | | |
|---|---|---|---|
| JP | 05122136 | | 5/1993 |
| JP | 09182146 | | 7/1997 |
| JP | 10094037 | | 4/1998 |
| JP | 2001112050 | A | 4/2001 |
| JP | 2003009239 | A | 1/2003 |
| JP | 2003169379 | | 6/2003 |
| JP | 2005-080197 | * | 3/2005 |
| JP | 2005080197 | | 3/2005 |
| JP | 2005080199 | | 3/2005 |
| WO | 02065800 | A1 | 8/2002 |

OTHER PUBLICATIONS

3rd Generation Partnership Project; Technical Specification Group Radio Access Network; User Equipment (UE) procedures in idle mode and procedures for cell restriction in connected mode (Release 5), 3GPP TS 25.304 V5.8.0 (Mar. 2005) 1-45pp.

Final Office Action dated Jun. 17, 2009 received in U.S. Appl. No. 11/270,680.

Non-Final Office Action dated Jan. 11, 2008 received in U.S. Appl. No. 11/270,680.

Non-Final Office Action dated Dec. 22, 2008 received in U.S. Appl. No. 11/270,680.

Notice of Allowance dated Mar. 10, 2011 received in U.S. Appl. No. 11/270,680.

Extended European Search Report dated Nov. 27, 2006 received in EP Patent Application No. 05256954.8-1525.

* cited by examiner

FIG. 2

| MOBILE STATION ID | LOCATION INFORMATION | SUPPORTABLE MOBILE COMMUNICATION SYSTEM |
|---|---|---|
| MS1 | BS1-2、BS2-2 | SYSTEM 100、SYSTEM 200 |
| MS2 | BS1-1 | SYSTEM 100 |
| MS3 | BS2-3 | SYSTEM 200 |
| MS4 | BS1-3、BS2-3 | SYSTEM 100、SYSTEM 200 |

*FIG. 3*

| GEOGRAPHICAL INFORMATION | SYSTEM 100 | SYSTEM 200 | SYSTEM 300 |
|---|---|---|---|
| AREA 401 | BS1-1 | BS2-1 | — |
| AREA 402 | BS1-2 | BS2-2 | — |
| AREA 403 | BS1-3 | BS2-3 | — |
| AREA 404 | BS1-4 | BS2-4 | BS3-4 |

FIG. 8

| MOBILE STATION ID | LOCATION INFORMATION | SUPPORTABLE MOBILE COMMUNICATION SYSTEM | WAITING SYSTEM INFORMATION |
|---|---|---|---|
| MS1 | BS1-2, BS2-2 | SYSTEM 100, SYSTEM 200 | SYSTEM 200 |
| MS2 | BS1-1 | SYSTEM 100 | SYSTEM 100 |
| MS3 | BS2-3 | SYSTEM 200 | SYSTEM 200 |
| MS4 | BS1-3, BS2-3 | SYSTEM 100, SYSTEM 200 | SYSTEM 100 |

MOBILE COMMUNICATION NETWORK SYSTEM AND LOCATION REGISTRATION METHOD

BACKGROUND OF THE INVENTION

1. Field of the invention

The present invention relates to a mobile communication network system configured by a plurality of mobile communication systems.

2. Description of the Related Art

At the present, a mobile communication system for a cellular phone etc. shifts from a second generation system such as a PDC (Personal Digital Cellular) method to a third generation system based on a CDMA (Code Division Multiple Access) method, wherein a variety of services based on the third generation system are started.

In this type of conventional mobile communication network system, the mobile communication systems are respectively provided according to the respective communication methods and individually need to grasp a location of a user terminal (mobile station). Such being the case, location information of the mobile station is registered with respect to each of the mobile communication system in a database called, a home location register (which will hereinafter be also simply abbreviated to HLR) within the mobile communication network system. Further, the location of the mobile station (which will hereinafter be also simply abbreviated to MS) can be grasped according to a communication area of a base station (which will hereinafter be also simply be abbreviated to BS) installed in each cell, and therefore information about each base station has hitherto been employed for the location information of the mobile station.

Herein, a location registration procedure of the mobile station in the conventional mobile communication network system will be explained with reference to FIG. 11. FIG. 11 is a diagram showing a location registration sequence of the mobile station in the conventional system. In FIG. 11, MS represents the mobile station, BS 1 indicates a base station in a mobile communication system 1, BS 2 designates a base station in a mobile communication system 2, and HLR stands for the home location register. Further, the mobile communication system 1 is, e.g., the CDMA wireless system, the mobile communication system 2 is, e.g., the PDC wireless system, and the MS is the user terminal having wireless interface functions for both of the COMA method and the PDC method. In this case, the MS is capable of performing the communications with both of the mobile communication system 1 and the mobile communication system 2, and hence the conventional system has a necessity of independently conducting location registration for each of the mobile communication system 1 and the mobile communication system 2.

On the other hand, a next generation mobile communication method enabling further high-speed wireless communications is now under examinations. Various categories of standards for this type of next generation mobile communication method are drawn up by 3GPP (3rd Generation Partnership Project). In particular, a technology related to a cell selection and a cell reselecting process in an idle mode procedure applied to the user terminal is disclosed in the following, conventional Non-Patent document 1. The conventional Non-Patent document 1 is "User Equipment (UE) procedures in idle mode and procedures for cell reselection in connected mode (Release 5) (3GPP TS 25.304, 2005-03, V5.8.0.)."

In the conventional mobile communication network system shown in FIG. 11, a problem is that a dual-mode-supported mobile station needs to transmit radio waves for the location registration to each of the wireless systems and therefore consumes a large quantity of electric power.

On the other hand, in the next generation mobile communications, with a speedup in transmission rate and a cooperation of the plurality of wireless systems with each other, it is desirable to actualize such a system that users can utilize the wireless systems without being aware of these wireless systems in whatever environments. Then, it is considered that in the next generation mobile communications, the plurality of mobile communication systems are separately employed corresponding to applications of the users, and a mobile communication network taking a composite form of these systems will be configured.

SUMMARY OF THE INVENTION

It is an object of the present invention to actualize a mobile communication network system capable of reducing electric power consumption of each of a mobile station device and a base station device by performing cooperative communication linkage between a plurality of wireless systems.

The present invention adopts the following configurations in order to solve the problems. Namely, the present invention is a mobile communication network system configured by a plurality of mobile communication systems each including a base station performing wireless communications with a mobile station, comprising a storage unit storing location information of the mobile station, an acquisition unit acquiring, when receiving a location registering request from the mobile station, a communication-enabled mobile communication system of the mobile station as a sender of the location registering request, a specifying unit specifying a base station existing in other mobile communication system than the mobile communication system including the base station receiving the location registering request of the acquired communication-enabled mobile communication system and existing in the periphery of the base station receiving the location registering request, and a control unit storing information of the base station receiving the location registering request and information of the specified base station as location information about the sender mobile station of the location registering request in the storage unit.

In the present invention, when receiving the location registering request from the mobile station, the information of the base station receiving the location registering request and the information of the base station existing within the mobile communication system through which the sender base station of the location registering request can perform the communication and existing in the periphery of the base station receiving the location registering request, are batchwise location-registered as the location information of the sender mobile station.

Hence, according to the present invention, it is possible to reduce the location registering requests transmitted from the mobile stations. With this reduction, an uplink radio wave interference quantity from the mobile stations can be decreased, and therefore retransmissions etc. caused by the interference can be also reduced. Hence, the electric power for the transmissions of the mobile station terminals can be decreased.

Further, the present invention is related to a mobile communication network system configured by a plurality of mobile communication systems each including a base station performing wireless communications with a mobile station, comprising a storage unit storing location information of the mobile station, an extraction unit extracting, based on the location registering request sent from the mobile station, information about a base station located in the periphery of the mobile station in each of the plurality of mobile communication systems utilizable by the mobile station, and a control unit storing information about the extracted base station as location information about the sender mobile station of the location registering request in the storage unit:

In the present invention, one piece of location registration information sent from the mobile station includes the information about the base station existing in the periphery where the mobile station is located with respect to each of the plurality of mobile communication systems utilizable by the sender mobile station, and the location registration of the mobile station can be batchwise conducted based on the location registration information.

With this contrivance, it is possible to reduce the location registering requests transmitted from the mobile stations. With this reduction, the uplink radio wave interference quantity from the mobile stations can be decreased, and therefore the retransmissions etc. caused by the interference can be also reduced. Further, on the side of the mobile communication network system, it may be sufficient to refer to only the location registering request from the mobile station, and hence the location registration process can be reduced.

Moreover, the present invention is related to a mobile communication network system configured by a plurality of mobile communication systems each including a base station performing wireless communications with a mobile station, comprising a waiting system retaining unit retaining a waiting mobile communication system of the mobile station, and an incoming notification unit acquiring, when receiving a communication request from another mobile station, the waiting mobile communication system of the mobile station designated as a communication destination of the communication request from the waiting system retaining unit, and transmitting an incoming notification responding to the communication request to the mobile station designated as the communication destination through the acquired mobile communication system.

In the present invention, the waiting mobile communication system of the mobile station is retained, and, when the communication request is sent from another mobile station, the incoming notification is transmitted through the waiting communication system of the mobile station as the communication destination.

Accordingly, in the present invention, the radio waves transmitted from the mobile communication systems can be reduced, and only any one of the wireless interfaces of the mobile station may simply wait, whereby the electric power consumption of the whole system can be decreased.

Still further, the present invention is related to a mobile station device capable of communicating with a plurality of mobile communication systems configuring a mobile communication network system, comprising communication units provided corresponding to each of the plurality of mobile communication systems, any one of the communication units being set in an communication-enabled status, and a switchover unit setting, based on a signal received by the communication unit, if a requested mobile communication system included in the signal is different from the mobile communication system corresponding to the communication unit set in the communication-enabled status, the communication unit corresponding to the requested mobile communication system in the communication-enabled status.

In the present invention, based on the signal received by the communication unit, the communication unit kept in the communication-enabled status is collated with the requested mobile communication system contained in this signal. If a difference between both of the mobile communication systems is confirmed from this collation, the mobile communication system becoming the communication-enabled status is switched over.

Therefore, according to the present invention, the mobile station may wait through only any one of the wireless interfaces, and the electric power consumption can be reduced.

It should be noted that the present invention may also be a program for actualizing any one of the functions described above. Further, the present invention may also be a readable-by-computer storage medium stored with such a program.

According to the present invention, it is possible to provide the mobile wireless system capable of reducing the electric power consumption of each of the mobile station device and the base station device.

BRIEF DESCRIPTION OF THE DRAWINGS

FIG. 2 is a diagram showing an example of a table structure of a home location register in the first embodiment;

FIG. 3 is a diagram showing an example of a table structure of a geographical information management database;

FIG. 8 is a diagram showing an example of a table structure of the home location register in the third embodiment;

DESCRIPTION OF THE PREFERRED EMBODIMENTS

A mobile communication network system in respective embodiments of the present invention will hereinafter be described with reference to the drawings. Configurations of the embodiments that will be explained as below are exemplifications, and the present invention is not limited to the configurations of the following embodiments.

[First Embodiment]

The mobile communication network system in the first embodiment of the present invention will hereinafter be explained.

[System Architecture]

Figure 1:
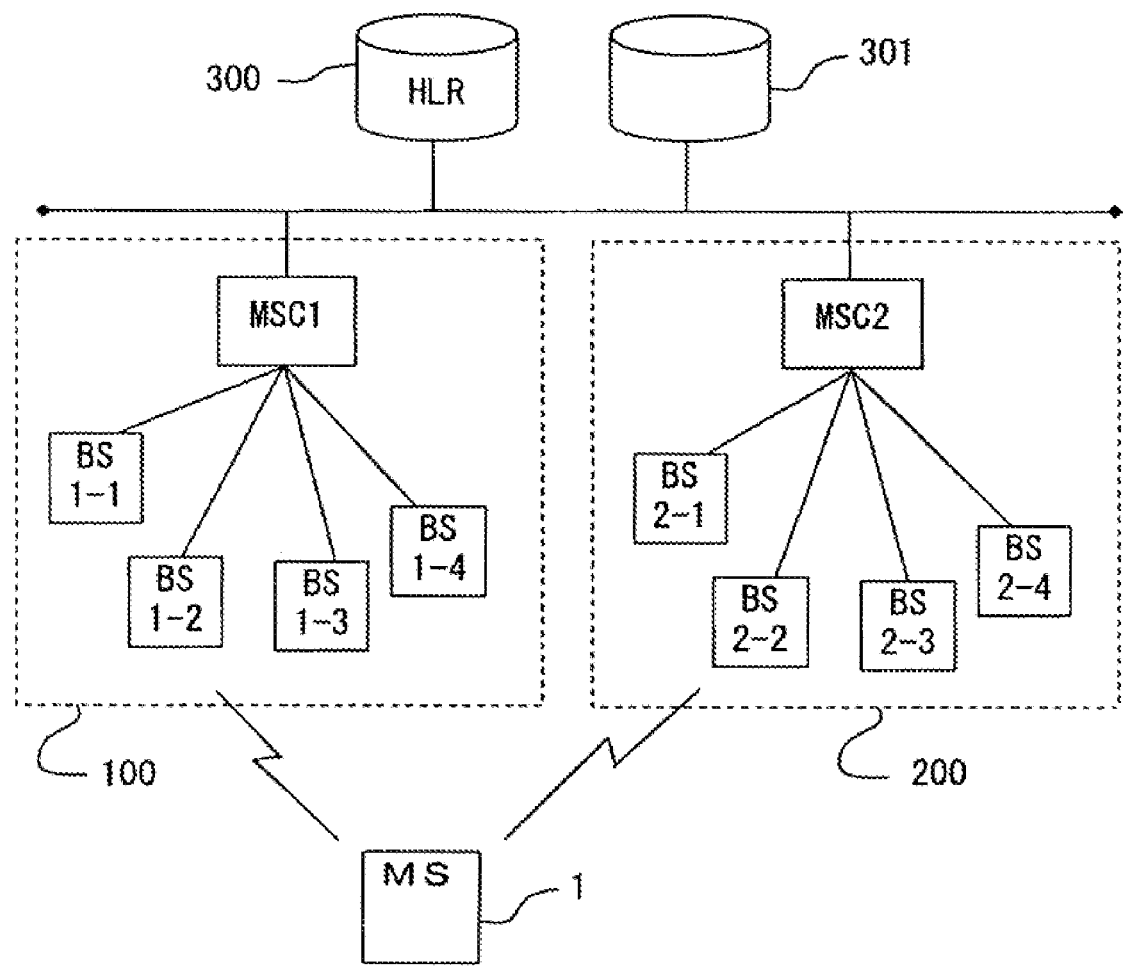
FIG. 1 is a diagram showing an example of a system architecture of a mobile communication network system in a first embodiment.

To begin with, the system architecture of the mobile communication network system in the first embodiment will be described with reference to FIG. 1. FIG. 1 is a block diagram showing the system architecture of the mobile communication network system in the first embodiment. The mobile communication network system is configured by mobile communication systems 100 and 200, a home location register 300, a geographical information management database 301 and a mobile station 1.

The mobile communication systems 100 and 200 are, for instance, systems actualized individually by communication methods different from each other, and establish a cooperative communication linkage with each other by sharing the HLR 300 and the geographical information management database 301 that are connected to the same network. Herein, the mobile communication system 100 is, e.g., a CDMA (Code Division Multiple Access) wireless system, and the mobile communication system 200 is, e.g., an OFDM (Orthogonal Frequency Division Multiplexing) wireless system.

Each of the mobile communication systems 100 and 200 is constructed of a Mobile services Switching Center (which will hereinafter simply be abbreviated to MSC) that actualizes each communication method, and of base stations. To be specific, the mobile communication system 100 is constructed of BS 1-1, BS 1-2, BS 1-3 and BS 1-4 and of a MSC 1 connected to these BSs, and the mobile communication system 200 is constructed of BS 2-1, BS 2-2, BS 2-3 and BS 2-4, and of a MSC 2 connected to these BSs. It should be noted that the present invention is limited neither to the architecture given above nor to the first embodiment especially in terms of the number of the MSC(s) and the number of the BSs. Examples of other system architectures will be explained later on in an item of Modified Example.

Respective function units configuring the mobile communication network system will hereinafter be described. The following discussion will exemplify the mobile communication system 100 in the mobile communication systems 100 and 200 building up the mobile communication network system. The respective function units configuring the mobile communication system 200 have the same functions as those of the individual function units of the mobile communication system 100 except the communication method.

<Mobile Station (MS)>

The MS 1 has a plurality of wireless interface functions, and transmits and receives radio waves to and from the corresponding base stations BSs by the communication methods actualized by the respective wireless interfaces. The MS 1 communicates with the BSs 1-1, 1-2, 1-3 and 1-4 by the communication method in the mobile communication system 100, and communicates with the BSs 2-1, 2-2, 2-3 and 2-4 by the communication method in the mobile communication system 200.

Further, the MS 1, when detecting that the MS 1 itself moves from a communication area that is covered by a certain BS to a communication area that is covered by an another BS, transmits a location registering request signal in order to make the mobile communication network system recognize a location of the MS 1 itself. For example, the MS 1, when detecting the movement from the communication area covered by the BS 1-1 to the communication area covered by the BS 1-2, transmits the location registering request signal. At this time, the MS 1 detects its movement with respect to each of the plurality of corresponding mobile communication systems, and transmits the location registering request signal to any one of the mobile communication systems. Note that the MS 1 may also recognize its movement from or to the communication area by receiving an annunciation signal carried on a feeble radio wave from the BS.

<Base Station (BS)>

The BS is installed in, e.g., each cell defined as a communication area, and transmits and receives the radio waves to and from the MS 1. Further, each BS implements any one of the communication methods supported by the mobile communication network system. Specifically, each of the BS 1-1, the BS 1-2, the BS 1-3 and the BS 1-4 has the communication interface for the mobile communication system 100, and each of the BS 2-1, the BS 2-2, the BS 2-3 and the BS 2-4 has the communication interface for the mobile communication system 200. Each BS receives the location registering request signal transmitted from the MS 1 and transfers this signal to the MSC within the same system.

<Home Location Register (HLR)>

The HLR 300 is a database stored, on an MS-by-MS basis, with present locations of the MSs and with (information (names) about) the mobile communication systems utilizable by the MSs. The HLR 300 is registered with, as MS's location information, for example, identifying information of the BS that covers, as its communication area, an area where the MS is located.

FIG. 2 is a diagram showing an example of a structure of a table of a HLR in this embodiment. As shown in FIG. 2, the HLR 300 is registered, on the MS-by-MS basis, with a mobile station ID for identifying the MS, location information indicating a present location of the MS, and information of mobile communication system supportable to the MS. BS information for every mobile communication system supportable to the MS is each registered in the location information field. In the example shown in FIG. 2, items of information about four MSs (MS 1 through MS 4) are registered. As to the MS 1 among these mobile stations, there are registered the system information that the MS 1 has a dual mode supported by the mobile communication system 100 and by the mobile communication system 200, and the location information showing BS 1-2 (the mobile communication system 100) and BS 2-2 (the mobile communication system 200).

<Geographical Information Management Database>

Figure 4:
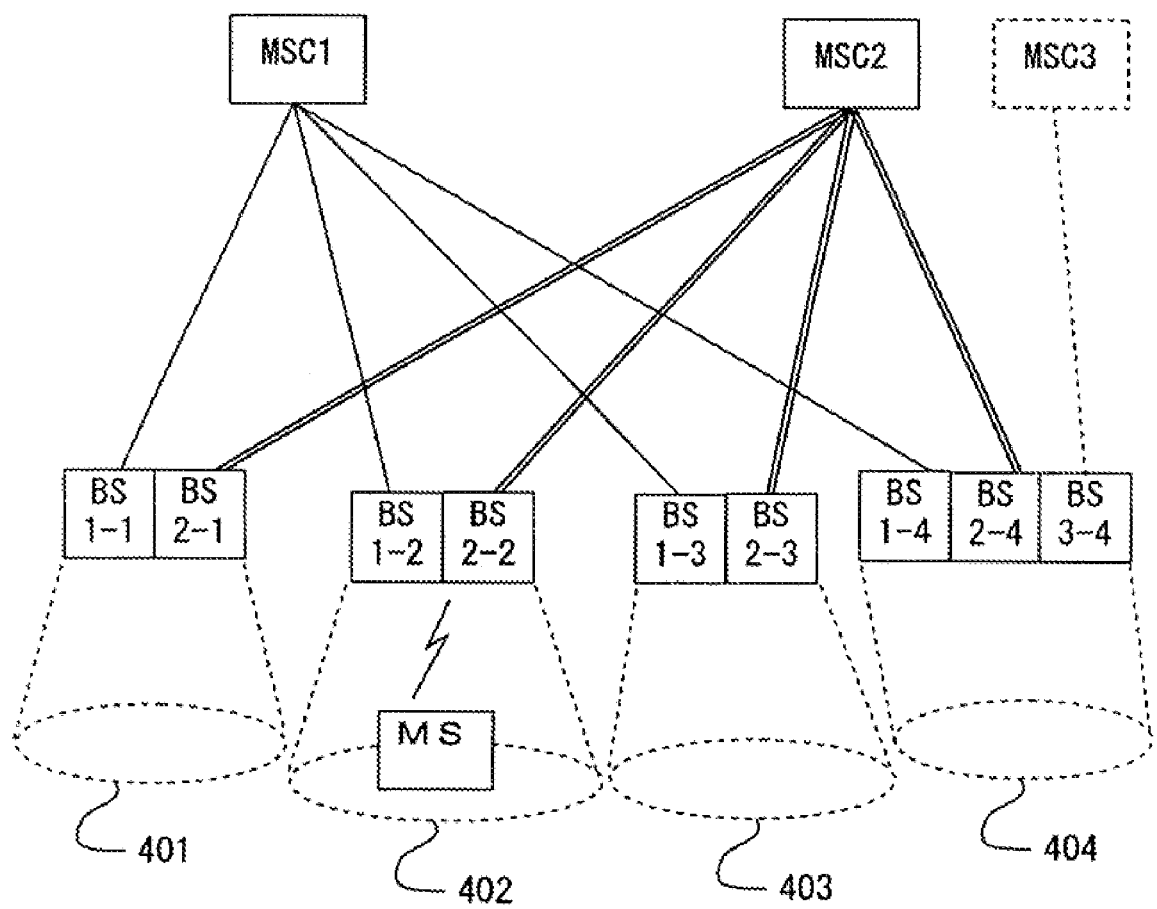
FIG. 4 is a diagram showing communication areas for respective base stations.

The geographical information management database 301 is stored, on an area-by-area basis, with a list of the BSs that cover a periphery of the area or this area as a communication area. FIG. 3 is a diagram showing an example of a table structure of the geographic information management database in this embodiment. The example in FIG. 3 shows that the BS 2-1 in the mobile communication system 200, which covers the same communication area as the BS 101 covers, is registered with respect to the BS 1-1. FIG. 4 illustrates an image of a system architecture in the example in FIG. 3. Namely, FIG. 3 shows that, as seen in the example in FIG. 4, a communication area 401 is covered by the BS 1-1 and the BS 2-1, a communication area 402 is covered by the BS 1-2 and the BS 2-2, a communication area 403 is covered by the BS 1-3 and the BS 2-3, and a communication area 404 is covered by the BS 1-4, the BS 2-4 and the BS 3-4. It should be noted that the configuration shown in FIGS. 3 and 4 is nothing more than one example, and the present invention is not limited to this configuration.

<Mobile Services Switching Center (MSC)>

The MSC 1 manages various items of information of the MS 1 by communicating with the BS 1-1, the BS 1-2, the BS 1-3 and the BS 1-4 under the same mobile communication system. The MSC 1 receives the location registering request transmitted from the MS 1 via any one of the BS 1-1, the BS 1-2, the BS 1-3 and the BS 1-4, and registers, based on this request, the location information of the MS in the HLR 300. In this case, the MSC 1 refers to the HLR 300 and to the geographical information management database 301, thereby acquiring the identifying information of the other BS that covers the periphery or the same communication area as the BS, which are connected to the mobile communication system supportable by the MS that is the sender of the location registering request signal and receives the location registering request signal.

The MSC 1 makes the location registration in a way that registers the identifying information of the BS with its identifying information acquired and the identifying information of the BS receiving the location registering request signal. For others, the MSC 1, in the case of, e.g., a mobile phone service, may perform a switching connection etc. by a call from a certain MS to another MS serving as a communication partner terminal.

[Operational Example]

Figure 5:
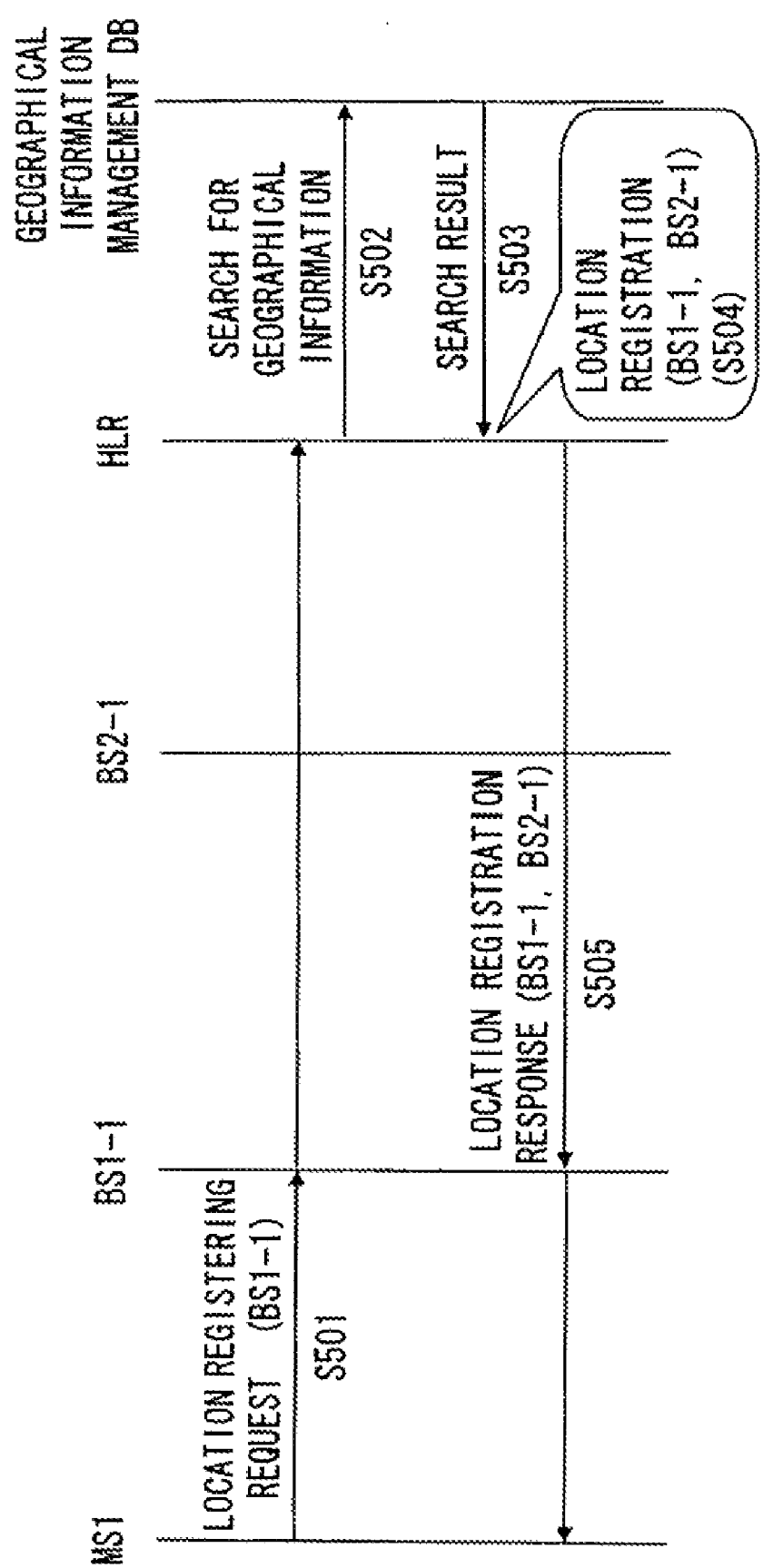
FIG. 5 is a diagram showing a location registration sequence in the first embodiment.

Next, an operational example of the mobile communication network system in the first embodiment will be explained with reference to FIG. 5. FIG. 5 is a diagram showing a location registering sequence in the mobile communication network system in this embodiment. FIG. 5 also shows an example of a case where the location registering request signal is transmitted from the MS 1 by the communication method for the mobile communication system 100.

The MSC 1, when receiving the location registering request signal from the MS 1 via the BS 1-1 (S501), acquires the mobile station ID that identifies the sender from the received location registering request signal. The MSC 1 refers to the HLR 300 on the basis of the acquired mobile station ID, thereby acquiring the information about the mobile communication system supportable by the MS 1. In the example in FIG. 2, the mobile communication systems 100 and 200 are extracted as the systems supportable by the MS 1. Further, the MSC 1 recognizes that the base station receiving the location registering request signal is BS 1-1.

Subsequently, the MSC 1 refers, based on the extracted system information, to the geographical information management database 301, and thus searches for an existence of the base station in the mobile communication system 200, which covers the periphery of the BS 1-1 receiving the location registering request signal or the same communication area (S502). The MSC 1 extracts, in the example in FIG. 3, the BS 2-1 from the geographical information management database 301 (S503).

The MSC 1 makes, based on this extracted result, the location registration in a way that registers BS 2-1 together with the BS 1-1 as the location information of MS 1 in the HLR 300 (S504). Finally, the MSC 1 notifies via the BS 1-1 that the location registration of the BS 1-1 and the BS 2-1 is completed (S505). Note that the MSC 1, if there is none of the relevant base station as a result of searching through the geographical information management database 301, makes the location registration of only the BS 1-1 in the HLR 300. Further, the MSC 1, when confirming that there is no other mobile communication system supportable by the MS 1 after searching through the HLR 300, directly makes the location registration of the BS 1-1 without searching through the geographical information management database 301.

<Operation/Effect in First Embodiment>

Herein, an operation and an effect of the mobile communication network system in the first embodiment discussed above will be described.

In the mobile communication network system in this embodiment, when receiving the location registering request signal from the MS 1 via the BS 1-1, this BS 1-1 is recognized, and the information about the mobile communication system supportably by the MS 1 is acquired from HLR 300.

Subsequently, the existence of the base station for other mobile communication system, which covers the periphery of the BS 1-1 or the same communication area, is searched from the geographical information management database 301 on the basis of the acquired system information. Then, based on a result of this search, together with the BS 1-1, the location registration of the BS 2-1 as the base station in the other mobile communication system supportable by the MS 1 is made as the location information of the MS 1 in the HLR 300.

Thus, in this embodiment, upon one location registering request from the MS 1, simultaneously with the requested base station in the mobile communication system, the base station in the other mobile communication system supportable by the MS 1 is location-registered.

With this contrivance, it is possible to reduce the location registering request signals transmitted from the MS and to decrease an uplink interference quantity.

[Second Embodiment]

The mobile communication network system according to a second embodiment of the present invention will hereinafter be described. The mobile communication network system according to the first embodiment explained earlier includes the geographical information management database 301 from which the base station in the other mobile communication system supportable by the MS is searched. The mobile communication network system in the second embodiment takes such a configuration that the MS itself notifies of the information about the base stations peripheral to the present location of the MS in other mobile communication systems utilizable by the MS.

[System Architecture]

A system architecture in the second embodiment is the same as what the geographical information management database 301 is omitted from the system architecture in the first embodiment shown in FIG. 1. Namely, the mobile communication network system in the second embodiment is configured by the mobile communication systems 100 and 200, the HLR 300 and the MS 1. The mobile communication systems 100 and 200 establish the cooperative communication linkage with each other by sharing the HLR 300 connected to the same network as these communication systems are connected. It should be noted that the present invention is not limited to the architecture given above, and examples of other architectures will be explained later on in the item of Modified Example. The descriptions of the function units having different functions from those in the first embodiment will be focused on these different functions, and the explanations of the same functions as those in the first embodiment are omitted.

<Mobile Station (MS)>

The MS 1 has a function of retaining, for every utilizable mobile communication system, the information about the base stations that cover the communication area where the MS 1 itself is located. The information about the base stations is acquired from annunciation transmitted from the BS in each mobile communication system. The MS 1 always receives the annunciation transmitted from the BSs in the plurality of mobile communication systems support able by the MS 1, and compares the identifying information of the BS contained in the received annunciation with the already-retained BS identifying information.

The MS 1, when detecting that the identifying information of the BS contained in the received annunciation is different from the identifying information of the already-retained BS, transmits the location registering request signal by use of the communication method of any one of the mobile communication systems. The MS 1 sets the identifying information of all self-retained BS in this location registering request signal.

<Mobile Services Switching Center (MSC)>

The location registering request in this embodiment contains the BS information with respect to all the mobile communication systems utilizable by the MS as the sender, and hence the MSC 1 registers batchwise these pieces of BS information as the location information in the HLR 300. The MSC 1 transmits a result of the registration to the MS via the BS receiving the location registering request.

<Home Location Register (HLR)>

The HLR 300 has, unlike the first embodiment, no necessity of memorizing the mobile communication systems utilizable by the MS, and therefore takes a structure in which the supportable system field is deleted from the table shown in FIG. 2.

[Operational Example]

Figure 6:
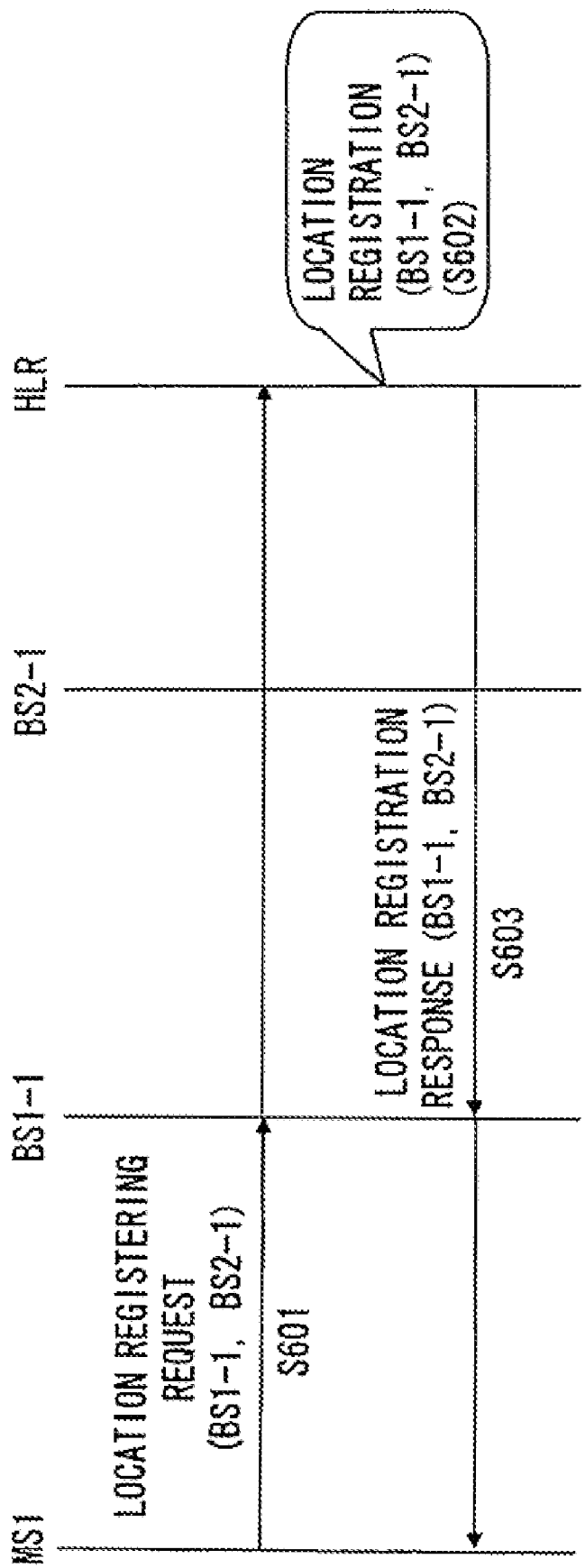
FIG. 6 is a diagram showing a location registration sequence in a second embodiment.

Next, an operational example of the mobile communication network system in the second embodiment will be explained with reference to FIGS. 4 and 6. FIG. 6 is a diagram showing a location registering sequence in the mobile communication network system in this embodiment. The discussion will hereinafter be made based on an example shown in FIG. 4.

The MS 1 is assumed to exist within the communication area 402 shown in FIG. 4. In this case, the MS 1 receives the annunciation transmitted from each of the base stations BS 1-2 and the BS 2-2, and retains information about the BS 1-2 and the BS 2-2 on the basis of the BS identifying information contained in the respective pieces of annunciation. In this status, when the MS 1 moves to the communication area 401, the mobile communication network system operates as follows. The MS 1, upon receiving the annunciation from the BS 1-1, acquires the information specifying the BS 1-1 from this annunciation. Similarly, the MS 1 receives the annunciation from the BS 2-1 and acquires the information specifying the BS 2-1 therefrom. The MS 1 compares the BS 1-1 and the BS 2-1 acquired from the annunciation with the BS 1-2 and the BS 2-2 kept retaining in terms of the same mobile communication systems. The MS 1, when recognizing that the BS is switched over in any one of the mobile communication systems, transmits the location registering request signal containing a setting of the latest updated base station information (BS 1-1, BS 2-1) by the communication method in any one of the mobile communication systems. Herein, it is assumed that the MS 1 has transmitted the location registering request signal by the communication method in the mobile communication system 100.

The MSC 1, when receiving the location registering request signal from the MS 1 via the BS 1-1 (S601), acquires the mobile station ID that identifies the sender and the base station information (BS 1-1, BS 2-1) from the received location registering request signal. The MSC 1 registers the acquired BS 1-1 and BS 2-1 as the location information associated with the acquired mobile station ID in the HLR 300 (S602). Finally, the MSC 1 notifies the MS 1 of completion of the location registration of the BS 1-1 and the BS 2-1 via the BS 1-1 (S603).

<Operation/Effect in Second Embodiment>

Herein, an operation and an effect of the mobile communication network system in the second embodiment discussed above will be described.

In the mobile communication network system according to this embodiment, the location registering request signal from the MS 1 contains the base station information in all the mobile communication systems utilizable by the MS 1. The MSC 1 updates the location information related to the MS 1 serving as the sender in the HLR 300.

Thus, in this embodiment, the location registering request sent from the MS 1 contains the base station information in all the mobile communication systems in which the location registrations should be done, and therefore the location registrations are conducted batchwise by this request.

With this contrivance, it is possible to reduce the location registering request signals transmitted from the MS and to decrease the uplink interference quantity. Further, the geographical information management database 301 can be eliminated, and the search process thereof can be reduced, thereby enabling a fast location registering process.

[Third Embodiment]

The mobile communication network system according to a third embodiment of the present invention will hereinafter be explained. The mobile communication network system in the embodiment discussed earlier is that the location registrations are conducted batchwise with respect to all the mobile communication systems utilizable by the mobile station in response to the location registering request sent from the MS. The mobile communication network system in the third embodiment has a feature concerning a call connecting function based on the location registering function in the first embodiment and the second embodiment.

[System Architecture]

The mobile communication network system in the third embodiment has the feature concerning the call connecting function, and hence the location registering function may take any type of system function in the first embodiment or the second embodiment. Accordingly, a system architecture of the mobile communication network system may be any one of the system architectures in the first embodiment and the second embodiment. The call connecting function characteristic of the third embodiment will hereinafter be explained on a unit-by-unit basis of the function units in the system architecture illustrated in FIG. 1.

<Mobile Station (MS)>

Figure 7:
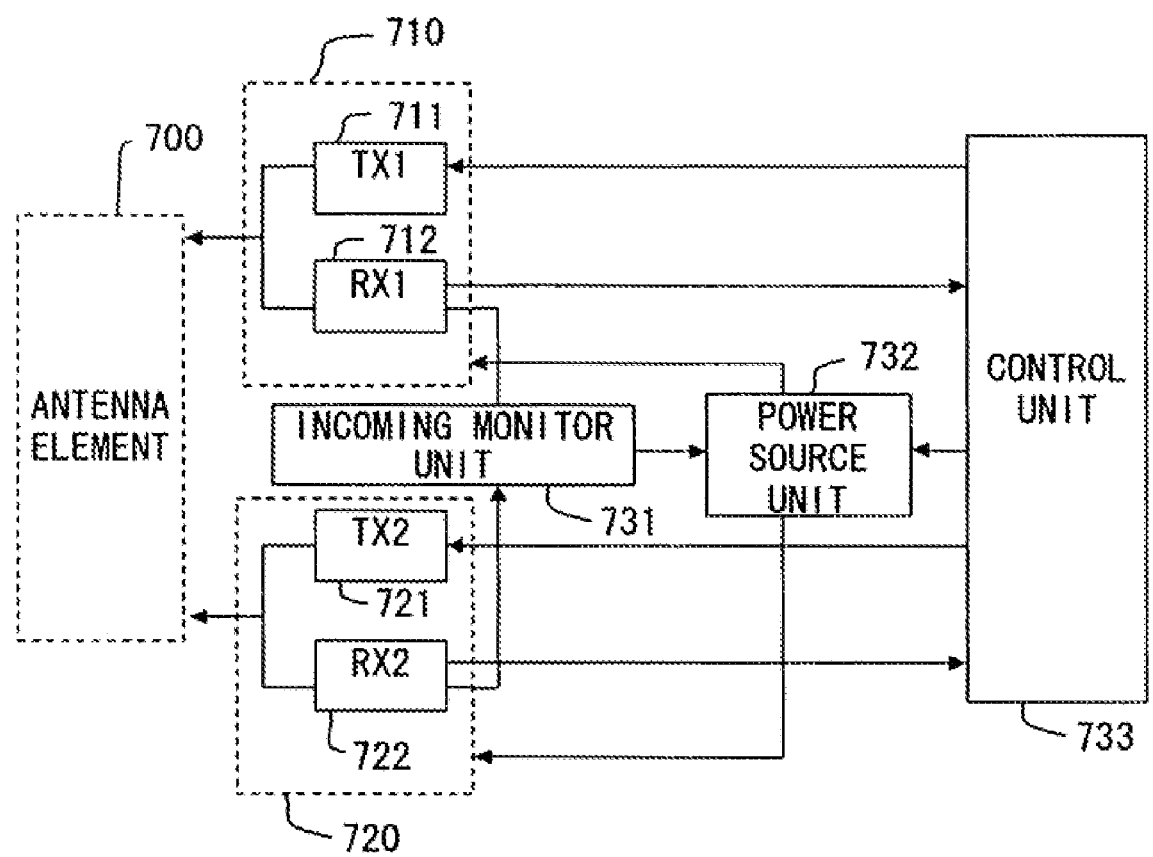
FIG. 7 is a diagram showing a device configuration of a mobile station in a third embodiment.

The MS 1 is a user terminal having a dual mode that supports the communication methods of both of the mobile communication systems 100 and 200, and is switched over so that only any one of the wireless interfaces functions. The MS 1 may take, for example, a device configuration as shown in FIG. 7. FIG. 7 is a diagram showing the device configuration of the mobile station in the third embodiment. The MS 1 is constructed of an antenna element 700, a wireless interface 710 actualizing the communication method of the mobile communication system 100, a wireless interface 720 actualizing the communication method of the mobile communication system 200, an incoming monitor unit 731, a power source unit 732, a control unit 733, etc. . . . Each of the function units may be constructed of a hardware circuit and may thus actualize a series of processes, and may further be actualized by making a CPU (Central Processing Unit) execute a control program, etc. stored on a memory.

An antenna element 700 may be constructed of two antenna elements connected respectively to the wireless interfaces 710 and 720, and may also be constructed of one antenna element from which signals outputted from the wireless interfaces 710 and 720 are synthesized by a hybrid synthesizer etc. and then outputted. The mobile communication network system does not limit the number of the antenna elements.

The power source unit 732 controls a quantity of power supply to the wireless interfaces 710 and 720 or power-on/power-off thereof, thus performing such control that only any one of the wireless interfaces becomes a communication-enabled status. Note that the communication-enabled status of the wireless interface may also be switched over by a control signal etc. transmitted from the power source unit 732.

The wireless interface 710 has a transmitting unit 711 and a receiving unit 712, and the wireless interface 720 has a transmitting unit 721 and a receiving unit 722. The wireless interfaces are controlled so that only any one of these interfaces becomes the communication-enabled status. When transmitting, the power source unit 732 is controlled by the control unit 733, whereby the should-be-transmitted-from wireless interface may also be selected. When receiving transmission data from the control unit 733, any one of the transmitting units 711 and 721 transmits the transmission data as radio signals.

On the other hand, when receiving, it is possible to receive only by the communication method of the wireless interface becoming the communication-enabled status at that time. Such a receivable status of the mobile station is also called a waiting status. Namely, the MS can receive the transmission signals from the mobile communication system according to the waiting status of the mobile station, and the radio signals received by the antenna element 700 are transferred to the receiving unit 712 or 722 of the corresponding wireless interface by the communication method thereof.

The incoming monitor unit 731 is connected to the receiving units 712 and 722, and monitors whether or not incoming signals received by these receiving units are incoming signals related to the other mobile communication system. The incoming monitor unit 731, when detecting the incoming to the other mobile communication system, instructs the power source unit 732 to switch over the waiting status.

<Home Location Register (HLR)>

The HLR 300 takes a structure having an addition of a field for storing MS waiting system information to ,the structure in the first embodiment and the second embodiment. This field is stored with pieces of information about the mobile communication systems receiving the recent location registering request signals.

FIG. 8 is an example of a table structure in which the third embodiment is applied to the HLR 300 in the first embodiment. The field for storing the MS waiting system information is added to the rightmost column. For instance, when the location registering request signal transmitted from the MS 1 is received by the BS 2-2, the information specifying the mobile communication system 200 is stored in the field of a record associated with the MS 1.

<Mobile Services Switching Center (MSC)>

The MSC 1, upon receiving the location registering request, registers the HLR 300 with information (the mobile communication system 100) specifying the mobile communication system supported by the MSC 1 itself, as recent waiting system information of the sender MS.

Further, the MSC 1, when receiving a communication request from the MS to another MS, transmits an incoming notifying signal to the MS serving as a communication destination. At this time, the MSC 1, with respect to the communication destination MS, extracts the waiting system information from the HLR 300, and checks whether or not the extracted waiting system is the mobile communication system 100 to which the MSC 1 itself belongs. The MSC 1, when judging that the communication destination MS does not wait in the mobile communication system 100, transfers the communication request to the MSC 2 according to the waiting system. The communication request to be transferred may contains information specifying the mobile communication system 100 requested by the sender mobile station MS 2. At this time, the MSC 1 may memorize that the communication request has been transferred because of a necessity of eventually transmitting the incoming notifying signal.

The MSC 2, to which the communication request has been transferred, checks the waiting system of the MS serving as the communication destination in the same way as described above, and transmits the incoming notification via the BS registered in the HLR 300. The incoming notification may have a setting of the information specifying the mobile communication system 100 requested by the sender MS 2.

[Operational Example]

Figure 9:
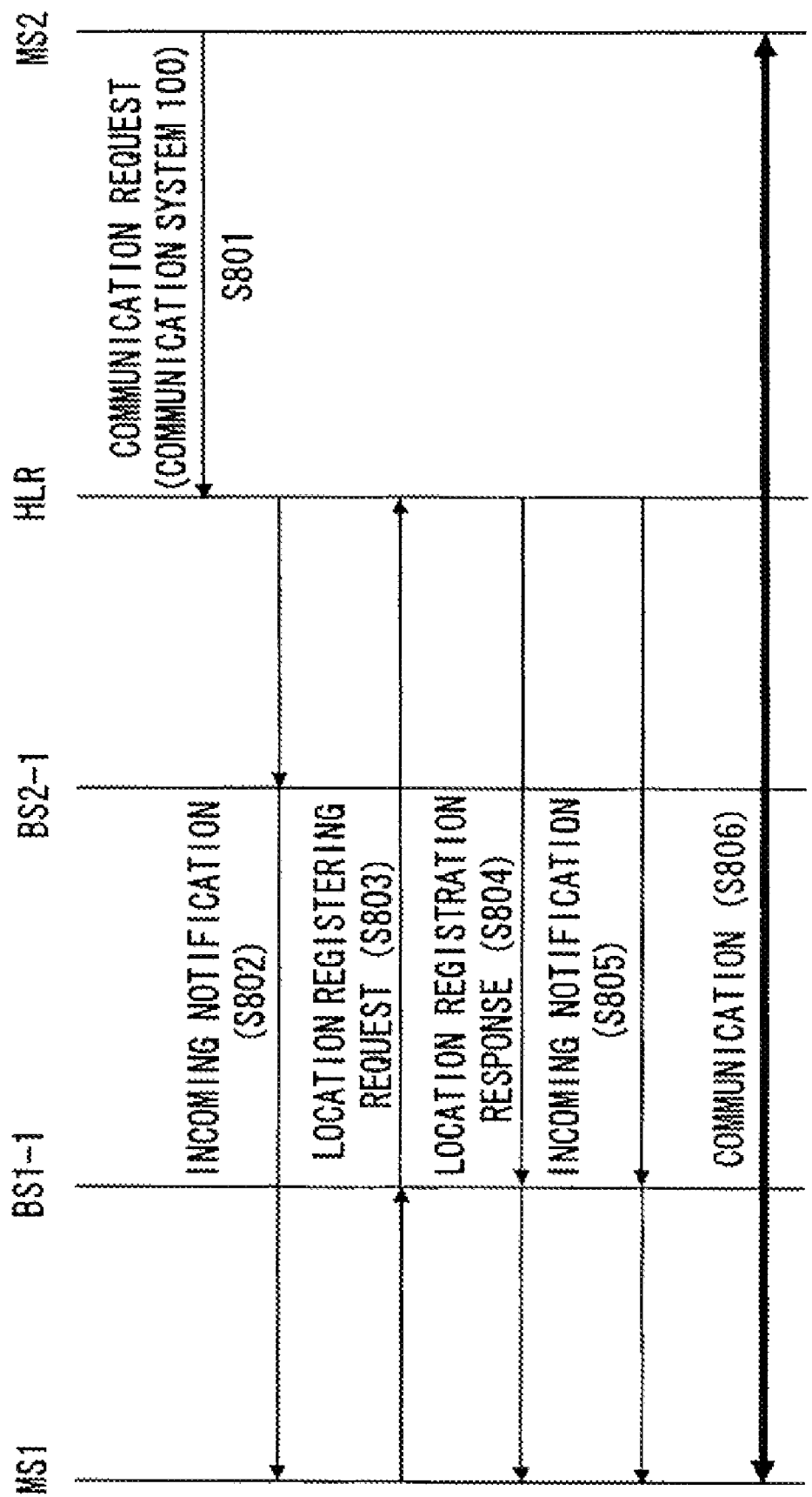
FIG. 9 is a diagram showing a call connection sequence in the third embodiment.

Next, an operational example of the mobile communication network system in the third embodiment will be explained with reference to FIG. 8. FIG. 9 is a diagram showing a call connection sequence of the mobile communication network system in this embodiment. Given hereinafter is an explanation by exemplifying a case in which the HLR 300 is registered with the mobile communication system 200 as the waiting system information of the MS 1 and with BS 1-1 and the BS 2-1 as the location information of the MS 1, in which state the communication request addressed to the MS 1 is transmitted in the mobile communication system 100 from the MS 2.

The MSC 1 receives the communication request from the MS 2 via BS in the mobile communication system 100 (S801). The MSC 1, upon receiving the communication request, extracts from the HLR 300 the waiting system information of the MS 1 serving as the communication destination. In this case, the MSC 1 recognizes that the MS 1 waits in the mobile communication system 200. The MSC 1, as the MS 1 waits in the system different from the mobile communication system supported by the MSC 1 itself, transfers this communication request to the MSC 2. After transferring the request, the MSC 1 may be set in a standby status for retransmitting an original incoming notification.

The MSC 2, when receiving the communication request, searches through the HLR 300 in the same way as the MSC 1 does, and recognizes that the MS 1 waits in the mobile communication system 200. The MSC 2, from this recognition, sends the incoming notification to the MS 1 via the BS 2-1 registered in the location information field in the HLR 300 (S802). This incoming notification has a setting of the information specifying the mobile communication system 100 requested by the sender MS 2.

The MS 1, upon receiving the incoming notification, judges whether or not this incoming notification is related to the mobile communication system different from the mobile communication system kept in the waiting status (the incoming monitor unit 731). The MS 1, when judging in this judging process that the incoming notification is related to the different mobile communication system, switches over the waiting status and sets the mobile communication system 100 in the communication-enabled status (the power source unit 732). The MS 1, when confirming that the waiting status of the MS 1 itself is switched over, transmits the location registering request signal by the communication method of the mobile communication system 100 after being switched over.

The MSC 1, when receiving this location registering request signal via the BS 1-1 (S803), makes the location registration by the method in the first embodiment or the second embodiment, and sets in the HLR 300 the mobile communication system 100 as the waiting system information about the MS 1. Through this setting, the MSC 1 detects that the waiting status of the MS 1 is switched over. The MSC 1 sends a location registration completion response to the MS 1 (S804). Subsequently, the MSC 1, because of having transferred the communication request earlier and detected that the MS 1 serving as the communication destination was switched over to the desired mobile communication-system, sends again the original incoming notification via the BS 1-1 (S805).

The MS 1 detects the reception of the incoming notification about the mobile communication system in the present waiting status, and therefore gets into the communication status (S806).

<Operational Example of Mobile Station>

Figure 10:
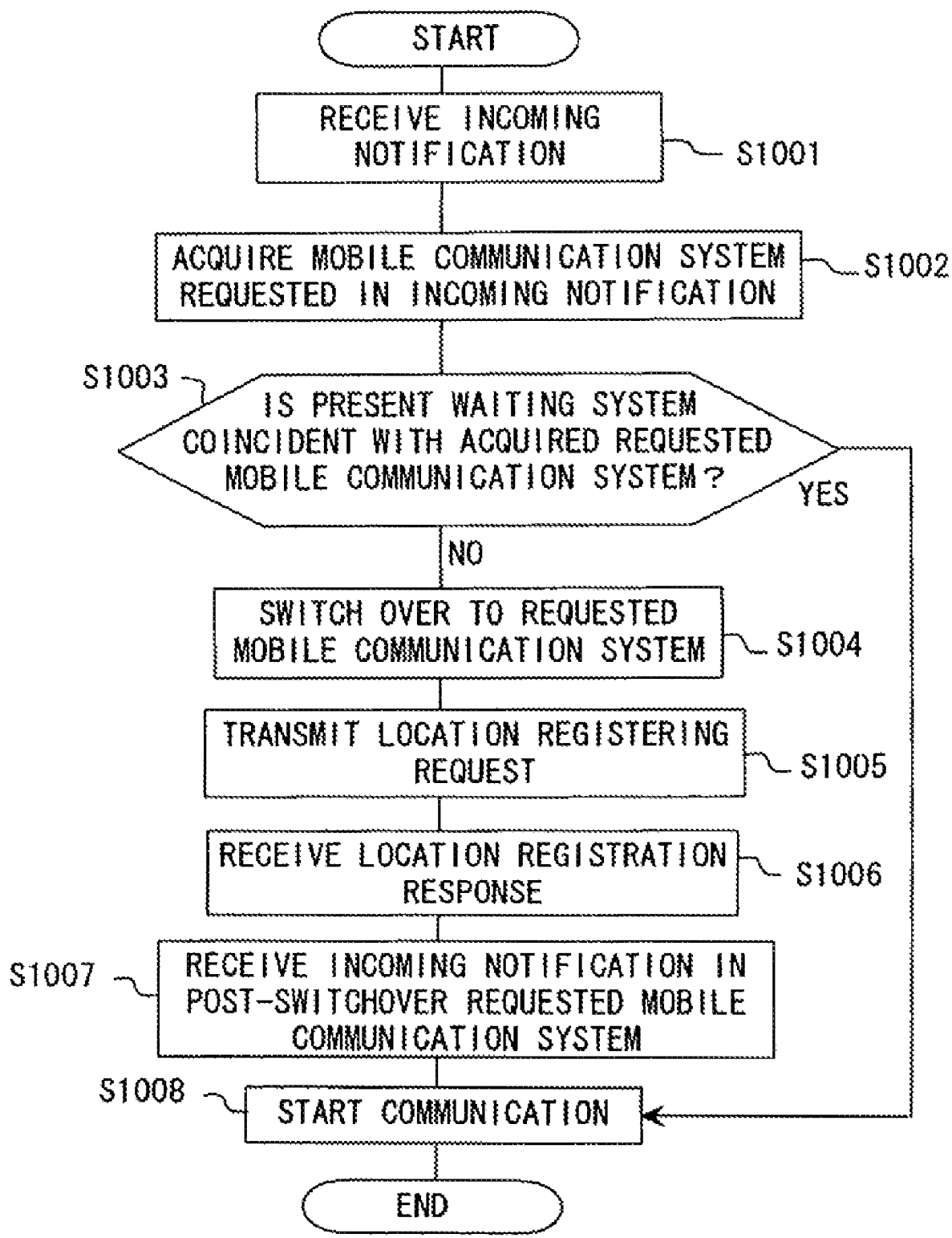
FIG. 10 is a flowchart showing an operation flow of the mobile station in the third embodiment.
Figure 11:
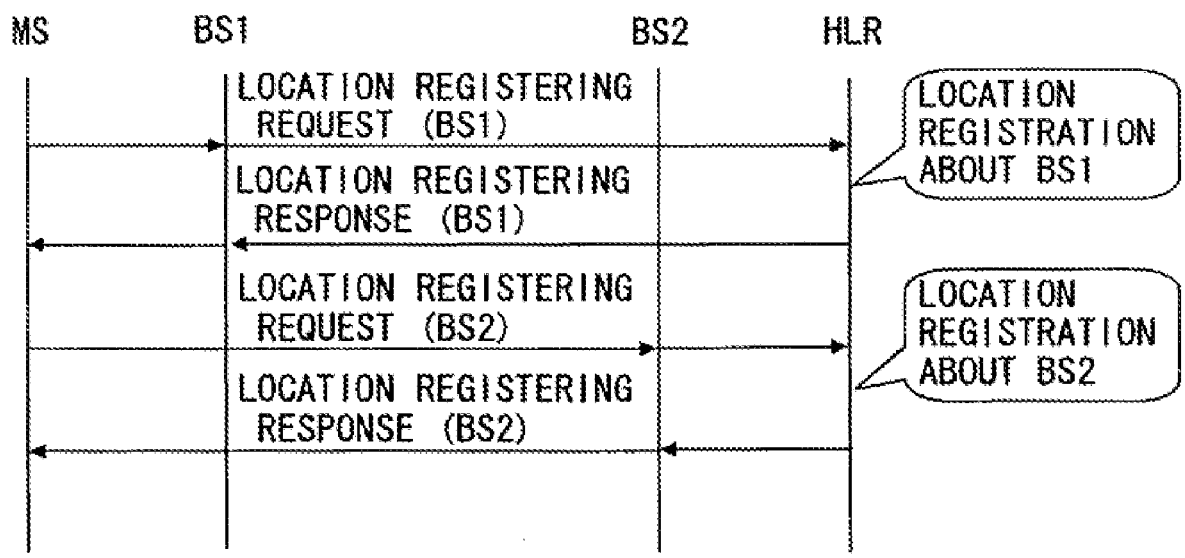
FIG. 11 is a diagram showing a location registration procedure in a conventional system.

The above description has illustrated the operational example of the whole mobile communication network system in the third embodiment. An operational example concerning the mobile station will hereinafter be explained with reference to FIG. 10. FIG. 10 is a flowchart showing an operation flow of the mobile station in the third embodiment.

The MS 1, when receiving the incoming notification (S1001), acquires the mobile communication system requested in this incoming notification (S1002). The MS 1 collates the thus-acquired requested mobile communication system with its own waiting system (S1003). The MS 1, when judging from this collation that the present waiting system is coincident with the requested mobile communication system acquired (S1003; YES), directly starts the communication with the partner mobile station that has sent the transmission request (S1008).

While on the other hand, the MS 1, when judging that the requested mobile communication system is different from the present waiting system (S1003; NO), judges that the incoming notification is related to the different mobile communication system, and switches over the waiting status to the requested mobile communication system (S1004). The MS 1, thereafter, transmits the location registering request signal by the communication method of the mobile communication system after being switched over (S1005).

The MS 1 receives a location registration response that responds to the location registering request signal (S1006), and receives the incoming notification in the requested mobile communication system after being switched over (S1007). Finally, the MS 1 starts the communication with the communication requester mobile station through the requested mobile communication system (S1008).

[Operation/Effect in Third Embodiment]

Herein, an operation and an effect of the mobile communication network system in the third embodiment discussed above, will be described.

In the mobile communication network system in this embodiment, in response to the location registering request signal from the MS 1, the waiting system of the MS 1 is registered in the HLR 300. If the communication partner mobile station sends the communication request to the MS 1 through the mobile communication system different from the waiting system of the MS 1, the waiting system registered in the HLR 300 is searched for, and the incoming notification is sent through the waiting system of the MS 1.

The MS 1, when receiving the incoming notification, checks matching. between the waiting system and the requested mobile communication system. If mismatching between these systems is confirmed by this check, in the MS 1, the waiting system is switched over to the requested mobile communication system. Further, when the switchover of the waiting system is completed in the MS 1, the location registering request is sent through the mobile communication system after being switched over.

Subsequently, in the mobile communication network system, when the location registering request is received, the location registration is conducted, and the MS 1 waiting system to be registered in the HLR 300 is updated. It is recognized from this update that the MS 1 is switched over to the requested mobile communication system, and again the incoming notification is sent through the post-switchover mobile communication system. From this onward, the MS 1, as the reception of the incoming notification through the requested mobile communication system is confirmed, becomes the communication-enabled status with the communication partner mobile station.

Thus, in this embodiment, when the communication request is sent through the mobile communication system different from the waiting system of the MS 1, the incoming notification is transmitted once in the waiting system. With this transmission, the waiting system of the MS 1 is switched over, and, from this onward, the communications can be performed through the requested mobile communication system.

With this contrivance, the mobile station simply may wait through only any one of the wireless interfaces, and the electric power consumption can be reduced.

[Modified Example]

In the embodiments of the present invention discussed above, the location registering function is controlled by the MSC, however, the base station itself may have this location registering function. In this case, the base station receiving the location registering request signal may conduct the location registration in the HLR 300 in a way that refers to the HLR 300 and to the geographical information management database 301.

Further, a control device for controlling the plurality of mobile communication systems in the mobile communication network system is newly provided, and the location registering function may also be actualized by this control device. In this case, the call connecting function in the third embodiment may also be carried out by this control device.

[Others]

The embodiments disclose the following inventions. The inventions disclosed in respective Notes can be combined to the greatest possible degree as the necessity may arise.

(Note 1)

A mobile communication network system having a plurality of mobile communication systems each including a base station performing wireless communications with a mobile station, comprising:

a storage unit storing location information of the mobile station;

an acquisition unit acquiring, when receiving a location registering request from the mobile station, a communication-enabled mobile communication system of the sender mobile station of the location registering request;

a specifying unit specifying a base station existing in other mobile communication system than the mobile communication system including the base station receiving the location registering request of the acquired communication-enabled mobile communication system and existing in the periphery of the base station receiving the location registering request; and a control unit storing information of the base station receiving the location registering request and information of the specified base station as location information about the sender mobile station of the location registering request in the storage unit.

(Note 2)

A mobile communication network system according to Note 1, further comprising:

a system storage unit storing the communication-enabled mobile communication system of the mobile station; and a geographical information storage unit storing, as to the target base station, information of a base station in other mobile communication system than a mobile communication system including the target base station, the base station being located in the periphery of the target base station, wherein the acquisition unit acquires the communication-enabled mobile communication system of the sender mobile station of the location registering request from the system storage unit, and the specifying unit specifies the base station from the geographical information storage unit.

(Note 3)

A mobile communication network system having a plurality of mobile communication systems each including a base station performing wireless communications with a mobile station, comprising:

a storage unit storing location information of the mobile station;

an extraction unit extracting, based on the location registering request sent from the mobile station, information about a base station located in the periphery of the mobile station in each of the plurality of utilizable mobile communication systems of the mobile station; and a control unit storing information about the extracted base station as location information about the sender mobile station of the location registering request in the storage unit.

(Note 4)

A mobile station device capable of communicating with a plurality of mobile communication systems configuring a mobile communication network system, comprising:

a receiving unit receiving annunciation signal transmitted from each of base stations in the plurality of mobile communication systems;

a retaining unit retaining the information of the base station located in the periphery of the mobile station device itself with respect to each of the plurality of mobile communication systems based on the base station information included in the annunciation signal; and a transmitting unit transmitting, if the retained information of the base station is different from the base station information included in the received annunciation signal, a location registering request including the retained information of the base stations with respect to the plurality of mobile communication systems to any one of the mobile communication systems.

(Note 5)

A mobile communication network system having a plurality of mobile communication systems each including a base station performing wireless communications with a mobile station, comprising:

a waiting system retaining unit retaining a waiting mobile communication system of the mobile station; and an incoming notification unit acquiring, when receiving a communication request from another mobile station, the waiting mobile communication system of the mobile station designated as a communication destination of the communication request from the waiting system retaining unit, and transmitting an incoming notification responding to the communication request to the mobile station designated as the communication destination through the acquired mobile communication system.

(Note 6)

A mobile communication network system according to Note 5, wherein the waiting system retaining unit retains the mobile communication system receiving the location registering request from the mobile station as the waiting mobile communication system of the sender mobile station of the location registering request.

(Note 7)

A mobile communication network system according to Note 6, wherein the incoming notification unit, after transmitting the incoming notification, when receiving the location registering request from the mobile station designated as the communication destination and when the waiting system retaining unit confirms a switchover of the waiting mobile communication system of the mobile station, again transmits the incoming notification through the post-switchover mobile communication system.

(Note 8)

A mobile station device capable of communicating with a plurality of mobile communication systems configuring a mobile communication network system, comprising:

a plurality of communication units provided corresponding to each of the plurality of mobile communication systems, any one of the plurality of communication units being set in an communication-enabled status; and a switchover unit setting, based on a signal received by any one of the plurality of communication units, if a requested mobile communication system included in the signal is different from the mobile communication system corresponding to any one of the plurality of communication units set in the communication-enabled status, the communication unit corresponding to the requested mobile communication system in the communication-enabled status.

(Note 9)

A location registering method in a mobile communication network system having a plurality of mobile communication systems each including a base station performing wireless communications with a mobile station, comprising the steps of:

acquiring, when receiving a location registering request from the mobile station, a communication-enabled mobile communication system of a sender mobile station of the location registering request;

specifying a base station existing in other mobile communication system than the mobile communication system including the base station receiving the location registering request of the acquired communication-enabled mobile communication system and existing in the periphery of the base station receiving the location registering request; and registering information of the base station receiving the location registering request and information of the specified base station as location information about the sender mobile station of the location registering request.

(Note 10)

A location registering method in a mobile communication network system having a plurality of mobile communication systems each including a base station performing wireless communications with a mobile station, comprising the steps of:

extracting, based on a location registering request sent from the mobile station, information about a base station located in the periphery of the mobile station in each of the plurality of utilizable mobile communication systems of the mobile station; and registering information about the extracted base station as location information about the sender mobile station of the location registering request.

(Note 11)

A communication connecting method in a mobile communication network system having a plurality of mobile communication systems each including a base station performing wireless communications with a mobile station, the method comprising:

a retaining step of retaining a waiting mobile communication system of the mobile station; and a step of acquiring, when receiving a communication request from another mobile station, the waiting mobile communication system of the mobile station designated as a communication destination of the communication request, and transmitting an incoming notification responding to the communication request to the mobile station designated as the communication destination through the acquired mobile communication system.

(Note 12)

A communication connecting method according to Note 11, wherein the retaining step retains the mobile communication system receiving the location registering request from the mobile station as the waiting mobile communication system of the sender mobile station of the location registering request.

(Note 13)

A communication connecting method according to Note 12, further comprising:

a step of again transmitting, after transmitting the incoming, notification, when receiving the location registering request from the mobile station designated as the communication destination and when confirming a switchover of the waiting mobile communication system of the mobile station, the incoming notification through the post-switchover mobile communication system.

(Note 14)

A communication interface switching method in a mobile station capable of communicating with a plurality of mobile communication systems configuring a mobile communication network system, the mobile station having communication interfaces provided corresponding to each of the plurality of mobile communication systems, any one of the communication interfaces being set in a communication-enabled status, comprising:

a step of switching over, based on a signal received by any one of the communication interfaces, if a requested mobile communication system included in the signal is different from the mobile communication system corresponding to any one of the communication interfaces set in the communication-enabled status, the communication interface corresponding to the requested mobile communication system to the communication-enabled status.

<Others>

The disclosures of Japanese patent application No.JP2005-227107, filed on Aug. 4, 2005 including the specification, drawings and abstract are incorporated herein by reference.

What is claimed is:

1. A mobile station device capable of communicating with a plurality of mobile communication systems within a mobile communication network system, each of the plurality of mobile communication systems corresponding to a different communication method, the mobile station device comprising:

a plurality of wireless interfaces each implementing any one of the different communication methods;

a power control unit controlling the plurality of wireless interfaces such that any one of the plurality of wireless interfaces becomes communication-enabled, wherein the communication-enabled wireless interface is set as a waiting wireless interface;

a comparing unit comparing, based on an incoming notification received by the waiting wireless interface, a requested mobile communication system designated by information included in the incoming notification with a mobile communication system corresponding to the communication method implemented by the waiting wireless interface;

a switchover unit directing the power control unit to switchover the wireless interface implementing the communication method of the requested mobile communication system to be communication-enabled, when the comparing unit judges that the requested mobile communication system is different from the mobile communication system implemented by the waiting wireless interface; and a transmitting unit transmitting a location registering request, for informing the mobile communication system corresponding to the communication method implemented by the waiting wireless interface, through the post-switchover wireless interface.

2. A communication interface switching method in a mobile station capable of communicating with a plurality of mobile communication systems within a mobile communication network system, each of the plurality of mobile communication systems corresponding to a different communication method, the mobile station having a plurality of wireless interfaces each implementing any one of the different communication methods and a power control unit controlling the plurality of wireless interfaces such that any one of the plurality of wireless interfaces becomes communication-enabled, wherein the communication-enabled wireless interface is set as a waiting wireless interface, the communication interface switching method comprising:

a comparing step of comparing, based on an incoming notification received by the waiting wireless interface, a requested mobile communication system designated by information included in the incoming notification with a mobile communication system corresponding to the communication method implemented by the waiting wireless interface;

a switchover step of directing the power control unit to switchover the wireless interface implementing the communication method of the requested mobile communication system to be communication-enabled, when it is judged in the comparing step that the requested mobile communication system is different from the mobile communication system implemented by the waiting wireless interface; and a transmitting step of transmitting a location registering request, for informing the mobile communication system corresponding to the communication method implemented by the waiting wireless interface, through the post-switchover wireless interface.

* * * * *